June 22, 1954  R. G. BALLARD  2,681,977
LIGHTING ARRANGEMENT FOR INSTRUMENTS
Filed Dec. 18, 1950  2 Sheets-Sheet 1
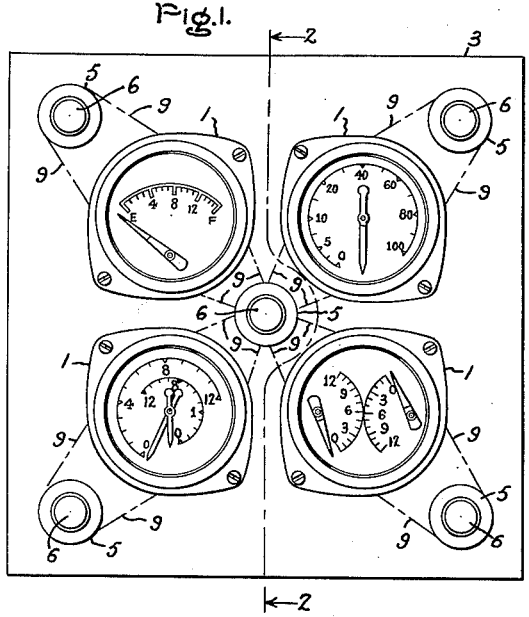
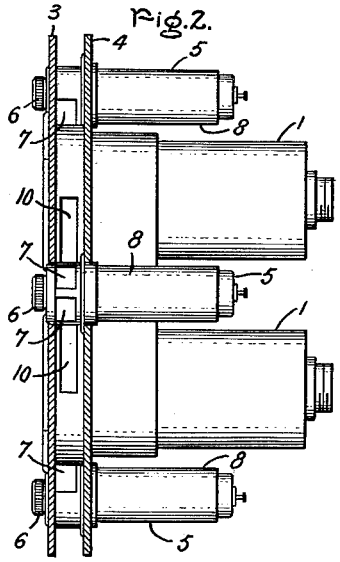
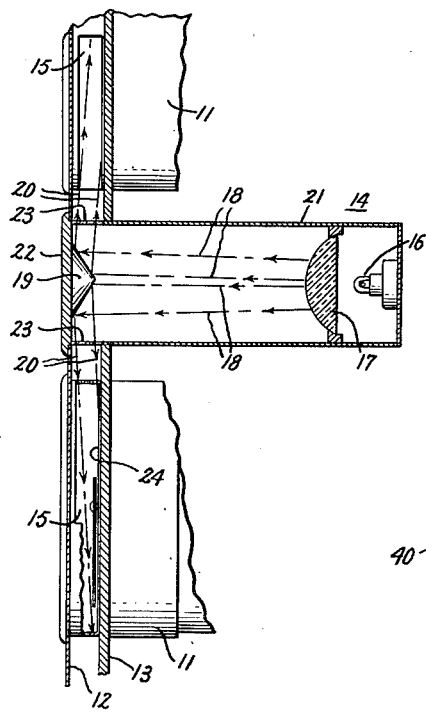
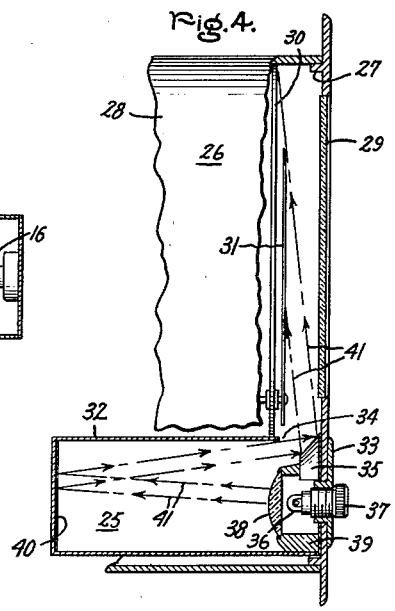
Inventor:
Robert G. Ballard,
by Russell A. Warner
His Attorney.

June 22, 1954
R. G. BALLARD
2,681,977
LIGHTING ARRANGEMENT FOR INSTRUMENTS
Filed Dec. 18, 1950
2 Sheets-Sheet 2
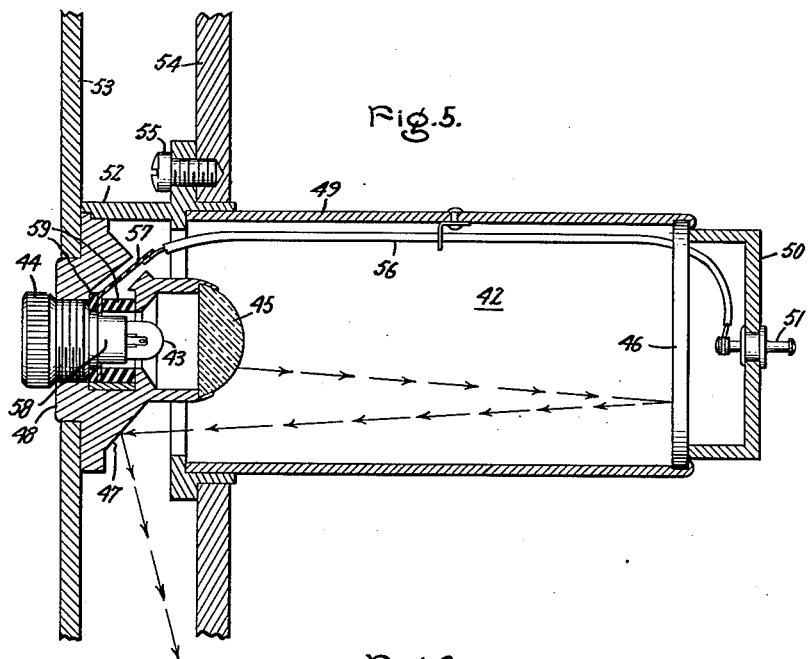
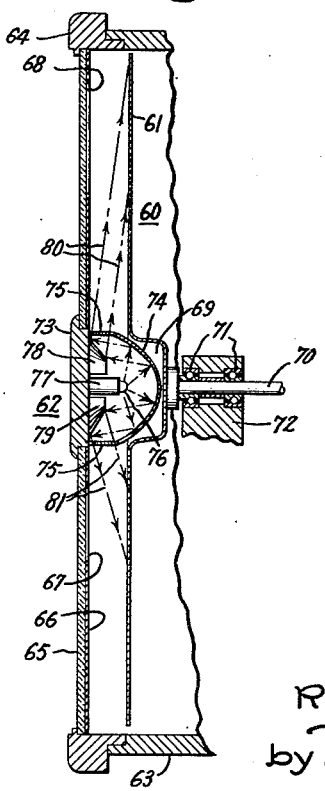
Inventor:
Robert G. Ballard,
by Russell A. Warner
His Attorney.

Patented June 22, 1954

2,681,977

UNITED STATES PATENT OFFICE 2,681,977

LIGHTING ARRANGEMENT FOR INSTRUMENTS

Robert G. Ballard, Saugus, Mass., assignor to General Electric Company, a corporation of New York Application December 18, 1950, Serial No. 201,345

6 Claims. (Cl. 240—2.1)

The present invention relates to improved arrangements for the illumination of instruments and, more particularly, to systems for directing a maximum of useful uniform-intensity illumination to the intelligence indicating portions of instruments providing visual output indications.

Lighting systems which provide illumination for the dials, dial indicia, and movable indicators of panel-mounted instruments should, for optimum utility, embrace the following advantages:

1. Ample and substantially uniform-intensity illumination of all intelligence-indicating elements;
2. Negligible transmission of interference illumination to the observer from non-indicating elements;
3. Compactness and simplicity of structure;
4. Provisions for fail-safe operation;
5. Easily-accessible light sources for facilitating replacements; and
6. Provisions for use in hermetically-sealed installations.

Conventional lighting systems for panel instruments may be divided into three general classifications in accordance with the relative orientations of the light source, observer, and the elements to be illuminated. The first is that in which the light source or sources floodlight the entire panel arrangement from without, thereby adding to the equipment which is in a position to impair freedom of motion of the observer and, more seriously, providing much extraneous light by reflection from the instrument glass, panel, knobs, levers, and other controls adjacent to the instrument panel. In the second type of system, the light sources are positioned within the instrument panel to direct their rays upon the fronts of the instrument dials and pointers, whereby stray illumination can be minimized only by extensive masking, the light sources are neither easily accessible nor suitable for hermetically-sealed installations, and uniform distribution of illumination is difficult to achieve. The third arrangement, that in which the light sources are located behind translucent instrument-dial faces, transmits excessive unwanted light to the observer and is also not suited for sealing and convenient access to the light sources. In any of the foregoing arrangements, the utilization of sources of invisible radiation together with indicia treated to respond thereto by producing visible light have generally proven deficient in that the markings appear indistinct, lack the required brilliance, and encourage eye fatigue.

Accordingly, it is the object of this invention to provide novel panel instrument lighting systems which possess the hereinbefore-mentioned advantages and which avoid the failings of known lighting arrangements.

The above and further objects and features of the present invention may be most effectively observed with reference to the following description taken in connection with the accompanying drawings, wherein:

Figures 1 and 2 illustrate, respectively, front and partly sectional side views of an instrument panel arrangement provided with illumination in accordance with the teachings of this invention;

Figure 3 is a partly sectional side elevation of one design of a lighting system incorporating inventive concepts here involved;

Figure 4 is a side elevation with portions, in section, of an embodiment of a light-distributing unit which has minimized axial length and provides convenient access to the light source therein;

Figure 5 discloses detailed structure of a unit having the general arrangement of elements shown in Figure 4; and Figure 6 represents, in a partially sectionalized side elevation, a completely hermetically sealed lighting unit having minimum overall dimensions and providing illumination for a single instrument.

Particularly advantageous utilization of the subject invention is realized in the illumination of a plurality of panel-type indicators. Figures 1 and 2 depict, respectively, a frontal and side pictorial view of a cluster of panel instruments, the latter view being taken along the section line 2—2 of Figure 1. These instruments, 1, include the conventional pointer and scale indicating arrangement and are flange-mounted on the outer panel 3 in a symmetrical cluster. As Figure 2 illustrates, a second mounting panel 4, positioned rearwardly of the front panel 3, may also be employed to provide the desired support occasioned by the arrangement of instruments and lighting units shown. Illumination of the indicating portions of instruments 1 is accompished by a plurality of lighting units 5 which are physically independent of the instruments and disposed, in panels 3 and 4, to distribute their light outputs in predetermined patterns. Each of the units 5 is installed in the panels such that the longitudinal axis of its generally cylindrical structure is substantially parallel to the longitudinal axes of the panel instruments and perpendicular to the outer panel 3. Projecting from the forward end of each unit is a knob 6 which, as will be described hereinafter, supports the light source and which may be removed manually from the outside of the outer panel.

Radiation from the lighting units emanates from radial aperture 7 in the forward portions of the cylindrical casings 8 and immediately to the rear of outer panel 3, which panel is preferably opaque to mask any stray radiation which may be reflected from non-indicating surfaces.

It is characteristic of these lighting structures, which are later disclosed in detail herein, that the parallel-ray beams emitted from each aperture are directed inwardly, that is, rearwardly of the outer panel, and are of widths sufficient to permit them to impinge upon the indicating elements of the instruments which they illuminate. Dashed lines 9 in Figure 1 define the widths of these beams and illustrate the preferred illumination of each instrument by two diametrically opposite lighting units. Where the outer casings of the panel instruments extend to the outer panel, as is shown to be the case in Figure 2, radial apertures 10 are provided in the instrument casings to admit the beams radiated from units 5. Fail-safe operation and uniform intensity illumination are insured inasmuch as two diametrically opposite units are employed, and undesired lighting is minimized by the masking afforded by the outer panel and by the rearward deflection of the beams produced by the lighting units. Instruments 1 may even be in direct contact with one another and units 5 without reducing efficiency of illumination.

One embodiment of an instrument lighting unit which produces instrument illumination in accordance with present invention is disclosed in Figure 3, wherein appears a partly sectionalized side view of a pair of instruments, 11, mounted in panels 12 and 13 together with a lighting unit 14. Each of the instruments 11 is provided with an aperture or slot, 15, in its outer casing to admit a parallel-ray light beam from unit 14 such that it may impinge upon the dial indicia and pointer or other indicating structures. It should be clear that the beams of visible light emitted from the unit 14 must be comprised of substantially parallel rays to permit accurate direction thereof upon the indicating elements alone and to minimize stray radiation and unwanted reflections. Output of such light beams is accomplished by unit 14, which comprises, essentially, a light source 16, a lens 17 which produces a beam of substantially parallel light rays 18 from the unidirectional radiation of source 16, and a conical mirror structure 19 which reflects rays 18 in parallel-ray beams 20 upon the desired surfaces of instruments 11. The mirror, lens and light source are arranged in that order from the front to rear of the unit casing 21, the casing being mounted at its forward end in panel 12 by means of an end member 22 which preferably is designed to facilitate withdrawal of the entire unit from the panels for convenient replacement of the light source. Light beams 20 are emitted from unit 14 through apertures in the casing 21, protection of the mirrored surfaces against dust and moisture being secured by sealing these apertures with transparent material 23. The thickness of the beams produced by the lighting unit, and, hence, the extent to which the instrument dial face 24 is illuminated for a construction involving a conical mirror having a predetermined base angle, is governed by either or both of the aperture thicknesses and the mirror height. Additionally, the rearward deflection of the output beams from the lighting unit and the areas of the instrument dials which are illuminated are determined by the mirror base angle and the relative orientations of the dial faces and mirror.

It is also feasible that the lighting arrangements of this invention provide access to the light source of a unit from the front thereof, obviating the need for a unit which may itself be withdrawn from a panel, and be utilized to illuminate a single instrument which incorporates the lighting unit. Figure 4 depicts this embodiment of a lighting unit, 25, in association with the instrument 26, the side view thereof being partly in section. Instrument 26 includes the conventional front flange 27, mating with the cylindrical instrument casing 28 and mounting the dial window 29, a dial plate 30, and a pointer 31. In addition, lighting unit 25 is mounted within the instrument casing 28, its generally cylindrical housing 32 being positioned in the instrument flange 27 by means of the lighting unit front flange 33. For the dial arrangement of the instrument 26, which carries indicia marked arcuately across the face of dial plate 30 for cooperation with pointer 31, the pattern of illumination on the dial plate is preferably restricted such that, only the indicating portions of the dial are rendered visible. The light beam producing the desired pattern of illumination is emitted by unit 25 and may be shaped appropriately by the masking effect of casing 32 surrounding the light-emitting aperture 34, or by the configuration of the frusto-conical mirror structure 35, or as a consequence of a combination of these factors. Light source 36 is supported at the forward end of the unit by the knob structure 37 which is threaded for engagement with and convenient removal from the unit flange 33. Although the electrical connections for the source 36 are not illustrated, and also have not been shown for source 16 in Figure 3, it will be readily apparent to those skilled in the art that these connections may be accomplished in numerous suitable ways, as, for example, in the manner later described for the embodiment of a lighting unit depicted in Figure 5. Lens 38, mounted within casing 32 by member 39, produces a substantially parallel-ray beam of light from the radiation of source 36, directing the beam to the rear of the casing 32 where it is reflected in a forward direction from a plane mirror 40 and caused to strike the mirrored surface of mirror structure 35 from where it is reflected to the dial plate 30 through the aperture 34. Rays 41 trace the path of light from lens 38 to plane mirror 40 to the reflecting surface of frusto-conical mirror 35 and to the dial plate 30 and pointer 31. In applications requiring hermetic sealing of either or both of the instrument 26 and lighting unit 25, a hermetic seal is formed between flange 27, flange 33, support member 39, and lens 38, whereby the removal of knob 37 and light source 36 does not interrupt the sealing of the interior of the lighting unit and instrument. It should be understood that the illuminated areas of the instrument dial plate and other indicating elements may be controlled by positioning the lighting unit with reference thereto, or selecting a frusto-conically shaped mirror having an appropriate base angle, or, more conveniently, by shifting the position of plane mirror 40 (means not shown) to change the angle of incidence and reflection of light striking the mirror 35.

Figure 5, a partially cross-sectional side view taken along the longitudinal axis of a preferred embodiment of a lighting unit, discloses constructional details which are particularly advantageous. Unit 42 includes a light source 43 supported in the structure of the removable knob 44, a lens 45 for producing a substantially parallel-ray beam of light from the radiation of source 43, a plane mirror 46, and a frusto-conical mirrored surface 47 on the lighting unit flange member 48. Optically, the unit 42 functions in a manner which is similar to that which has been described for unit 25 in Figure 4. Mechanically, unit 42 comprises a hollow cylindrical body member 49 which is closed at its inner end by plane mirror 46, an insulating end cap 50 mounting an electrical terminal 51 at the rearmost part of the unit assembly, and a webbed spacer member 52 which is affixed to and separates the front flange 48 and body member 49. Spacer member 52 bears radial slots or apertures through which the reflection from mirrored surface 47 passes to dial surfaces either directly or through apertures in instrument casings positioned nearby, depending upon whether unit 42 is utilized to illuminate a single instrument from within or a number of instruments from without. Where a plurality of instruments are illuminated, as in an arrangement similar to that of Figures 1 and 2, the flange 48 is engaged with the front panel 53 and the support and spacer member 52 is affixed to the inner panel 54 by means such as bolt 55. In the illumination of a single instrument from within, the panel 53 would, instead, be the front flange of the instrument and the panel 54 would be the dial member upon which the dial indicia are marked. Light source 43 is electrically energized by way of terminal 51, lead 56 connected to this terminal, contact member 57 which is coupled with lead 56 and the base 58 of the light source but insulated from other elements by insulators 59, and the grounded return path including the threaded base of knob 44, flange 48, and the grounded members coupled with flange 48. For hermetically sealed installations, the light transmitting apertures in member 49 may be sealed with transparent material and seals also provided between contact 57 and flange 48 and lens 45 supported thereby.

Figure 6 is a partial cross section taken along the longitudinal axis of the single instrument 60 which has two independent portions of its dial plate 61 illuminated by a hermetically sealed and extremely compacted lighting unit 62. That portion of the instrument 60 which has been illustrated may be representative of a directional gyroscope indicator structure, for example, and includes a cylindrical casing 63, front flange 64, dial window glass 65, dial masking plate 66 with apertures 67 and 68 therein, dial plate 61 with a central concave portion 69, and dial actuator shaft 70 supported by bearings 71 in the fixed mount 72. Indicators of this type bear two concentric and circular rows of indicating indicia on the dial face plates thereof, each row of indicia being visible through one of the masking plate apertures, and lighting unit 62 has been designed to illuminate such an indicator in accordance with the principles of the present invention.

Lighting unit 62 is centrally positioned on the window and masking plate of instrument 60, thereby occasioning the concavity 69 in the dial plate 61 to permit freedom of rotation of this plate with shaft 70. Although it will be apparent that the compacted construction of the lighting unit may be employed without provisions for hermetic sealing, unit 62 in Figure 6 is illustrated as both sealed and evacuated to form a replaceable sealed-beam device. The evacuated container is comprised of a mounting flange 73, a concave reflector 74 having light transmitting apertures therein, and transparent material 75 sealing the apertures. Within the container formed by these elements are mounted the light source 76, positioned at the focus of reflector 74, which preferably comprises a substantially parabolic mirror, a light shield 77 which confines the emission of light from source 76 to the area of the focal point of mirror 74, and mirrors 78 and 79 which may be sectors or segments of frustums of cones. Shield 77 insures that light from the filament 76 will first be reflected from parabolic mirror 74 and thus formed into substantially parallel-ray beams before subsequent reflection from the frusto-conically shaped mirrors 78 and 79. While in other applications only a single frusto-conical mirror may be required, the instrument 60 carries two radially spaced scales which must be separately illuminated at diametrically opposite positions and the desired illumination patterns are achieved by making the base angles of mirrors 78 and 79 of such values that they direct their respective reflected rays 80 and 81 upon the proper portions of dial plate 61. Light source 76 may, of course, comprise a conventional envelope-enclosed filament rather than an exposed filament, and would necessarily be of the former construction where the unit of the type represented by unit 62 is not sealed and evacuated.

It should be apparent that the present invention is susceptible of modification in numerous ways without departure from the scope or spirit thereof. By way of illustration, it is contemplated that the light source of a lighting unit including a parabolic mirror and conical reflecting surfaces, such as that of Figure 6, may be associated with a knob removable from the front of the unit. Light filters for limiting the output of any unit to a particular portion of the light spectrum may be positioned at any convenient location. Also, although the lenses employed have been shown to be plano-convex in configuration, other lenses or combinations thereof, or mirrors, may be utilized to produce the required beams of substantially parallel light rays or rays which are slightly divergent. The frusto-conical mirrors may, in certain applications, be comprised of stepped portions having different base angles, and, in other applications, these mirrors may have configurations other than frusto-conical, and may be for example, plane or conical.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. An instrument lighting unit comprising a substantially circular mounting flange, a hollow casing of circular cross section closed with said flange to form a closed opaque housing, said casing having at least one arcuate light-transmitting portion through the side wall thereof near said flange, a first reflector having at least one substantially conical reflecting surface disposed coaxially within said housing near said flange and adjacent said light-transmitting portion, a light source mounted on said flange within said housing, a second reflector within said housing and displaced from said flange axially along said casing, and means shielding said first reflector from direct illumination from said source and permitting light output from said source to impinge directly upon said second reflector, said second reflector being disposed to reflect direct illumination from said source upon said first reflector, and said first reflector being arranged to reflect illumination from said second reflector outwardly through said arcuate light-transmitting portion of said housing and away from said flange.

2. An instrument lighting unit as set forth in claim 1 wherein said second reflector comprises a substantially parabolic reflector and wherein said light source is positioned at substantially the focal point of said parabolic reflector, whereby said illumination reflected from said parabolic reflector is in substantially parallel rays.

3. A lighting unit according to claim 2 wherein said housing is sealed gas-tight and is at least partially evacuated, and wherein said light source comprises an incandescent filament within said evacuated housing.

4. An instrument lighting unit as set forth in claim 1 further comprising a knob structure mating with and removable from said flange, said light source being mounted in said knob structure for removal therewith from said flange, and a lens mounted in said shielding means directing illumination from said source to said second reflector in substantially parallel rays.

5. An instrument lighting unit comprising an opaque cylindrical casing structure having at least one arcuate light-transmitting portion through the cylindrical wall of said casing near one end thereof, a reflector having at least one conical reflecting surface disposed coaxially within and near said end of said structure and adjacent said arcuate light-transmitting portion, a light source within said structure mounted on said end thereof, means shielding said surface from direct rays of light from said source and permitting light output from said source to travel toward the other end of said structure, a mirror structure having a plane reflecting surface within said casing structure near the other end thereof and disposed to reflect light from said source upon said conical reflecting surface in substantially parallel rays, and a lens structure interposed between said source and mirror structure for directing light output from said source in substantially parallel rays upon said plane reflecting surface for reflection to said conical reflecting surface, said reflector being arranged to reflect said substantially parallel rays of light outwardly through said arcuate light-transmitting portion of said housing such that said outwardly transmitted rays are directed away from said one end and toward said other end of said casing structure.

6. A unit for illuminating the indicating indicia of at least one panel-mounted instrument having at least one light-transmitting portion through that part of the side wall of the instrument casing which is between the instrument dial and mounting panel, comprising a circular front mounting flange supported by said mounting panel, a substantially cylindrical lighting unit casing closed with said flange rearwardly of said panel to form a hollow closed opaque lighting unit housing, said cylindrical casing having at least one arcuate light-transmitting portion in the cylindrical side wall thereof disposed to permit transmission of light from the interior of said unit casing through said portion of said instrument casing, a knob structure mounted in said flange and removable from the front of said panel, a light source mounted in said knob structure and disposed within said unit housing near said flange when said knob structure is mounted in said flange, a mirror positioned within said unit housing near the end thereof rearmost from said flange, at least one frusto-conical reflector disposed coaxially within said cylindrical unit casing and near said arcuate light-transmitting portion, means shielding said reflector from direct rays of light from said source and permitting light from said source to impinge upon said mirror, and lens means within said casing producing substantially parallel rays of light from said source and directing said parallel rays upon said mirror, said mirror being disposed to reflect said rays to said frusto-conical reflector, and said reflector being disposed to reflect rays from said mirror outwardly through said arcuate portion of said unit casing with a rearward inclination in relation to said flange and panel.

References Cited in the file of this patent

UNITED STATES PATENTS

| Number | Name | Date |
|---|---|---|
| 1,159,419 | Roffy | Nov. 9, 1915 |
| 1,533,615 | Schwartz | Apr. 14, 1925 |
| 1,814,669 | Cushing | July 14, 1931 |
| 2,191,379 | Glasgow | Feb. 20, 1940 |
| 2,262,920 | Carbonara | Nov. 18, 1941 |
| 2,290,284 | Klein et al. | July 21, 1942 |